US011501252B1

(12) United States Patent
Warrier et al.

(10) Patent No.: US 11,501,252 B1
(45) Date of Patent: Nov. 15, 2022

(54) CONTEXT-BASED COMMUNICATION PLATFORM

(71) Applicant: American Airlines, Inc., Fort Worth, TX (US)

(72) Inventors: Sunita Warrier, Flower Mound, TX (US); Arun Dhanabal, Flower Mound, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 124 days.

(21) Appl. No.: 15/044,891

(22) Filed: Feb. 16, 2016

Related U.S. Application Data

(60) Provisional application No. 62/273,906, filed on Dec. 31, 2015.

(51) Int. Cl.
  *G06Q 10/10* (2012.01)
  *G06F 16/9535* (2019.01)

(52) U.S. Cl.
  CPC ......... *G06Q 10/10* (2013.01); *G06F 16/9535* (2019.01)

(58) Field of Classification Search
  CPC ....................................................... G06F 17/30
  (Continued)

(56) References Cited

U.S. PATENT DOCUMENTS

| 7,072,956 B2 * | 7/2006 | Parupudi ................. | G06F 21/62 709/220 |
| 2002/0099599 A1 * | 7/2002 | Minassian .............. | G06Q 10/08 705/13 |

(Continued)

FOREIGN PATENT DOCUMENTS

GB 2430336 A * 3/2007 ............ H04L 12/58

OTHER PUBLICATIONS

Till C. Lech and Leendert W. M. Wienhofen. 2005. AmbieAgents: a scalable infrastructure for mobile and context-aware information services. In Proceedings of the fourth international joint conference on Autonomous agents and multiagent systems (AAMAS '05). (Year: 2005).*

(Continued)

*Primary Examiner* — Paul R Fisher
(74) *Attorney, Agent, or Firm* — Haynes and Boone, LLP

(57) ABSTRACT

A system and method of providing a context-based communication platform includes storing an executable application on a computer readable medium within each remote computer in a plurality of remote computers, wherein when the application is executed the application is associated with an individual user; receiving, at a server and from the application within each remote computer in the plurality of remote computers, user contact data and user context data for each individual user, wherein the user context data includes data regarding at least one of: a role of the individual user; the location of the individual user; and a work assignment of the individual user; storing, in a database that is in communication with the server, the user contact data and user context data for each individual user; receiving, at the server, a communication that includes user context data associated with an intended recipient, the identity of which is unknown, wherein the intended recipient is one of the individual users; and identifying, using the server and the database, the user contact data of the unknown intended recipient based on the user context data associated with the unknown intended recipient.

6 Claims, 9 Drawing Sheets

(58) Field of Classification Search
USPC .................................................. 705/345
See application file for complete search history.

(56) References Cited

U.S. PATENT DOCUMENTS

| | | | | |
|---|---|---|---|---|
| 2004/0019606 | A1* | 1/2004 | Ackerman | G06Q 10/025 |
| 2004/0078373 | A1* | 4/2004 | Ghoneimy | G06Q 10/10 |
| 2004/0154022 | A1* | 8/2004 | Boss | G06Q 10/107 |
| | | | | 719/310 |
| 2005/0010694 | A1* | 1/2005 | Ma | H04N 1/001 |
| | | | | 709/250 |
| 2005/0197848 | A1* | 9/2005 | Chou | G06Q 30/0281 |
| | | | | 705/7.41 |
| 2007/0168131 | A1* | 7/2007 | Root | H04W 4/02 |
| | | | | 702/3 |
| 2008/0189162 | A1* | 8/2008 | Ganong | G08B 25/14 |
| | | | | 705/7.13 |
| 2008/0189360 | A1* | 8/2008 | Kiley | G06F 17/30867 |
| | | | | 709/203 |
| 2010/0146057 | A1* | 6/2010 | Abu-Hakima | H04L 12/1859 |
| | | | | 709/206 |
| 2012/0190386 | A1* | 7/2012 | Anderson | G01C 15/04 |
| | | | | 455/456.3 |
| 2013/0097269 | A1* | 4/2013 | Plotkin | H04L 51/02 |
| | | | | 709/206 |
| 2013/0185369 | A1* | 7/2013 | Bain | H04L 51/24 |
| | | | | 709/206 |
| 2014/0006163 | A1 | 1/2014 | Sengupta et al. | |
| 2014/0344446 | A1* | 11/2014 | Rjeili | H04L 43/04 |
| | | | | 709/224 |
| 2015/0033296 | A1* | 1/2015 | Yoshimura | H04L 63/107 |
| | | | | 726/5 |
| 2016/0344667 | A1 | 11/2016 | Lane et al. | |

OTHER PUBLICATIONS

Widemann, Marc, et al. "Work flow management of the ground handling at the airport through modular system optimizing." Proceedings of the Eurosim. 2010 (Year: 2010).*

Wittmann, Jochen, Carsten Esslinger, and Dietmar PF Möller. "Optimizing the Ground Handling at Airports: A Study Concerning a Bus Dispatchment Algorithm." (Year: 2009).*

Carsten Beuthel, Fan Dai, Emanue Kolb, Eckhard Kruse, A 3-D User Interface for Airport Resource Management, IFAC Proceedings Volumes, vol. 34, Issue 16, 2001, pp. 205-210 (Year: 2001).*

Álvarez-Daz, Néstor, Pino Caballero-Gil, and Francisco Martín-Fernández. Task Assignment through Indoor Location with Bluetooth Low Energy Devices., 2015 (Year: 2015).*

* cited by examiner

CONTEXT-BASED COMMUNICATION PLATFORM

CROSS-REFERENCE TO RELATED APPLICATION

This application claims the benefit of the filing date of, and priority to, U.S. Application No. 62/273,906, filed Dec. 31, 2015, the entire disclosure of which is incorporated herein by reference.

BACKGROUND

The present disclosure relates in general to a communication platform and, in particular, to a context-based communication platform for dynamically located and anonymous individuals.

DETAILED DESCRIPTION

Figure 1:
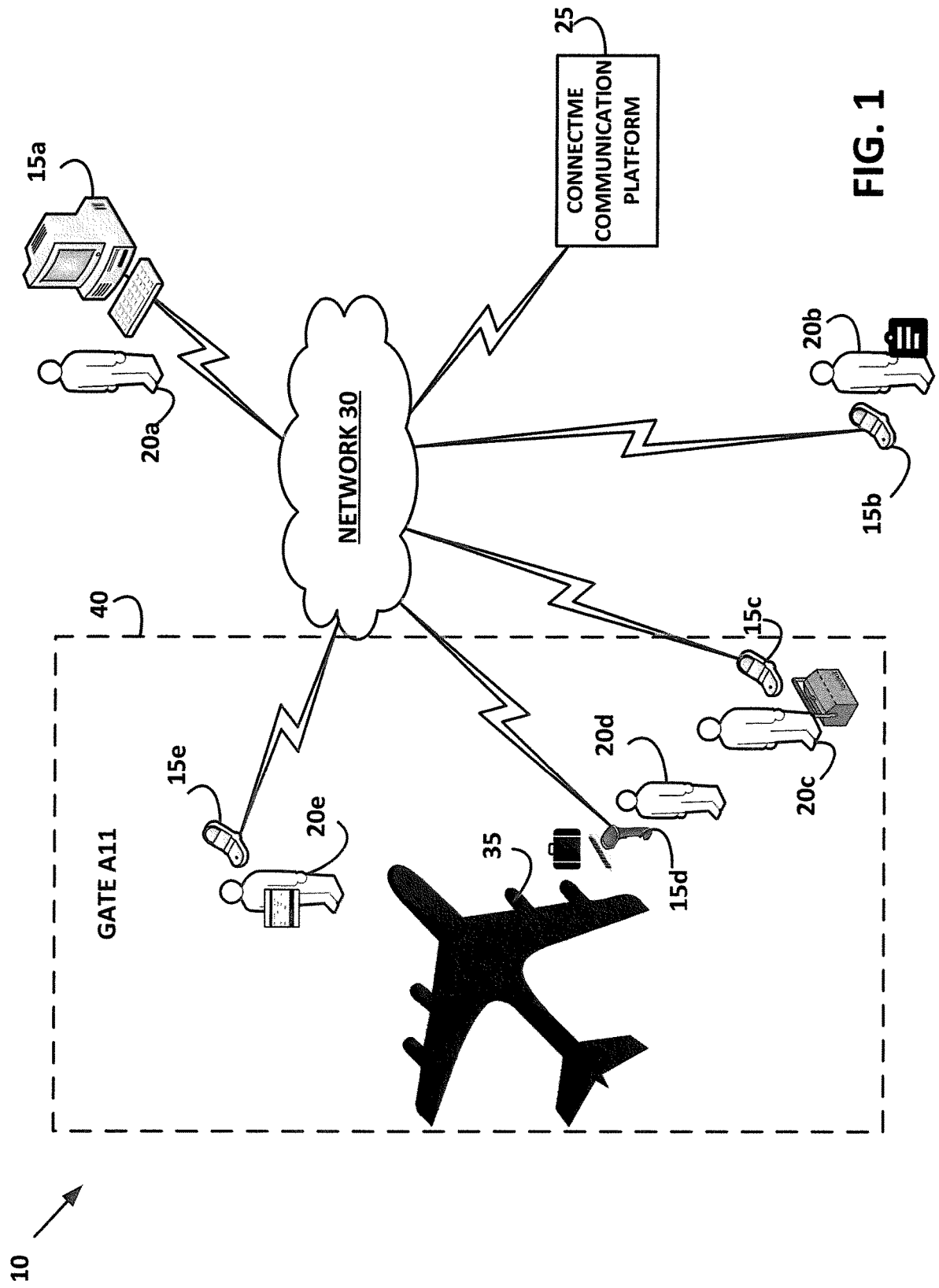
FIG. 1 is a diagrammatic illustration of a system according to an exemplary embodiment, the system including a computer.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, while many of the examples provided below pertain to transactions often conducted in the course of airline industry business, aspects of the present disclosure are applicable and/or readily adaptable to other industries, including rail, bus, cruise and other travel or shipping industries, rental car industries, hotels and other hospitality industries, entertainment industries, and others. Often, within a travel industry, it is necessary to communicate with an employee (i.e., an individual) or group of employees based on the context of the employee with the context of the employee being one of the role of the employee, the temporary location of the employee, or the work assignment associated with the employee.

Generally, the location and/or a work assignment of employees within a travel industry are temporary and dynamic. Thus, when a first employee is trying to communicate with another, second employee that is at a specific location or that has a specific work assignment, to first employee generally must first identify a work assignment, or airline flight, associated with the second employee; determine a group of employees associated with the correct work assignment; and then look up the contact information for the second employee associated with the correct work assignment that has the correct role. For example, if a user in an airport control tower wants to contact a crew chief assigned to an airline flight to inquire why the aircraft is delayed, the user in the airport tower would need to identify the airline flight identifier associated with the aircraft using a computer system or paper records, identify the group of employees assigned to the airline flight using a computer system or paper records, identify the correct employee from the group of employees assigned to the airline flight, access the personal contact information for the correct employee, and then initiate communication with the correct employee via one of a plurality of communication methods (i.e., phone, email, text, etc.). Similar steps would be required if: a user in baggage operations wants to notify a user in the tower that the aircraft may be delayed because additional baggage needs to arrive at the aircraft before the aircraft may depart; a customer service manager wants to contact an agent at a specific gate or other location; a shift coordinator wants to ensure that two agents are available to assist a customer at a specific gate, etc. Considering most individuals or employees now carry a mobile communication device or cell phone capable of receiving a phone call, text message, and/or email message, the ability to communicate with an employee is no longer dependent on the location of the individual (i.e., a physical, stationary office), especially within a travel industry that requires employees to be temporarily stationed at a variety of locations. That is, with current information and communications technology, it is required to know an employee's contact information to communicate, or at least initiate communication, with the employee. When a large number of employees are temporarily assigned to different locations, roles, and work assignments, it is difficult to quickly identify the contact information for the correct individual, which can result in the failure to timely communicate time-sensitive information. Additionally, there is a shortcoming in current information and communications technology, especially within travel industries, in that there is no central messaging system that: tracks and delivers messages to different applications within the system; sends messages to applications and users based on context-based information; and reduces the number of systems using polling to reduce duplication of communication efforts.

In an exemplary embodiment and as illustrated in FIG. 1, a system 10 includes a plurality of computers, such as computers 15a, 15b, 15c, 15d, and 15e that are associated with users 20a, 20b, 20c, 20d, and 20e, respectively. The system 10 also includes a communication platform 25 that allows communication, or at least initiation of communication, between users 20a-20e via a network 30 using context-based data or information associated with the user(s). In an exemplary embodiment, the platform 25 is referred to as "ConnectMe." Each of the users 20a-20e is associated with context-based information, which includes any one or more of: an employee role; an employee location; and an employee work assignment. For example, the user 20a of the computer 15a may have an employee role of dispatcher; the user 20b of the computer 20a may have the employee role of pilot and have a work assignment of piloting an aircraft 35, which is parked at a location 40 (i.e., gate A11) to complete an airline flight; the user 20c of the computer 15c may have an employee role of mechanic and have a work assignment of maintaining the aircraft 35 prior to its departure on the airline flight; the user 20d of the computer 15d may have an employee role of baggage handler, a location 40 of gate A11, and a work assignment of loading baggage into the aircraft 35 prior to its departure on the airline flight; user 20e of the computer 20d may have an employee role of an agent, a location 40 of gate A11, and a work assignment of loading, cleaning, or otherwise preparing for aircraft 35 prior to its departure on the airline flight.

Figure 2C:
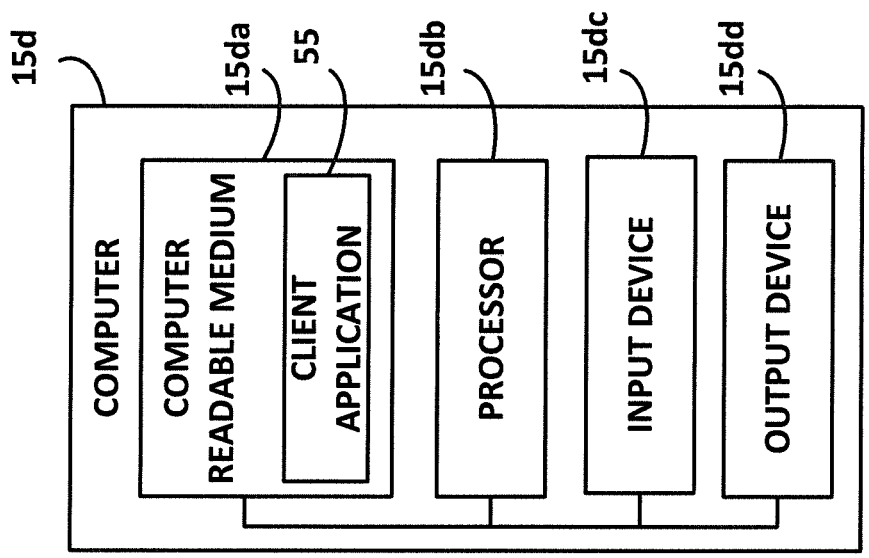
FIG. 2C is a diagrammatic illustration of the computer of FIG. 1, according to yet another exemplary embodiment.
Figure 2B:
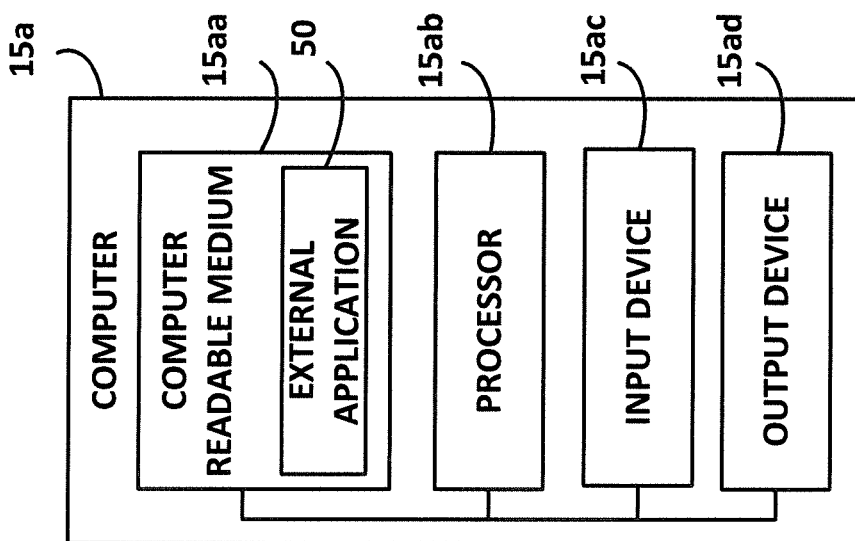
FIG. 2B is a diagrammatic illustration of the computer of FIG. 1, according to another exemplary embodiment.
Figure 2A:
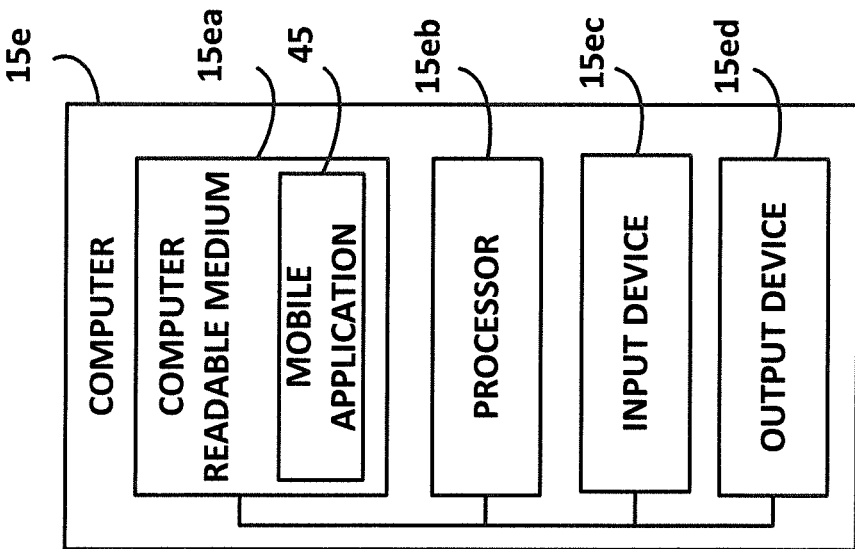
FIG. 2A is a diagrammatic illustration of the computer of FIG. 1, according to an exemplary embodiment.

In an exemplary embodiment, as illustrated in FIG. 2A with continuing reference to FIG. 1, the computer 15e includes a computer readable medium 15ea, a processor 15eb, an input device 15ec, and an output device 15ed. In an exemplary embodiment, instructions accessible to, and executable by, the processor 15eb are stored in the computer readable medium 15ea. In an exemplary embodiment, a mobile application 45 is stored in the computer readable medium 15ea. In an exemplary embodiment, the input device 15ec and the output device 15ed include a graphical display, which, in several exemplary embodiments, is in the form of, or includes, one or more digital displays, one or more liquid crystal displays, one or more cathode ray tube monitors, and/or any combination thereof. In an exemplary embodiment, the output device 15ed includes a graphical display, a printer, a plotter, and/or any combination thereof. In an exemplary embodiment, the input device 15ec is the output device 15ed, and the output device 15ed is the input device 15ec. However, the input device 15ec may be any type of keyboard, keypad, stylus, speaker, etc. In several exemplary embodiments, the computer 15e is a thin client. In several exemplary embodiments, the computer 15e is a thick client. In several exemplary embodiments, the computer 15e functions as both a thin client and a thick client. In several exemplary embodiments, the computer 15e is, or includes, a telephone, a personal computer, a personal digital assistant, a cellular telephone, other types of telecommunications devices, other types of computing devices, and/or any combination thereof.

FIG. 2B illustrates the computer 15a and FIG. 2C illustrates the computer 15d. In an exemplary embodiment, the computers 15a and 15c are substantially identical to the computer 15e and therefore, reference numerals used to refer to the features of the computers 15a and 15d that are substantially identical to the features of the computer 15e will correspond to the reference numerals used to refer to the features of the computer 15e except that the prefix for the reference numerals used to refer to the features of the computer 15e, that is, 15e, will be replaced by the prefix of the computers 15a and 15c, that is, 15a and 15c. However, and as illustrated in FIG. 2B, the mobile application 45 is omitted from the computer readable medium 15aa of the computer 15a, and instead, an external application 50 is stored in the computer readable medium 15aa. In an exemplary embodiment, the computer 15a may be a desktop computer or computer used by the air traffic control tower, etc. In an exemplary embodiment, the input device 15ac and the output device 15ad may be omitted from the computer 15a. In an exemplary embodiment, the mobile application 45 is omitted from the computer readable medium 15da, and instead, a client application 55 is stored in the computer readable medium 15da. In an exemplary embodiment, the computer 15d may be an operational device, such as CSM phones, or any device associated with Ramplink+, YADA, Dynamic Manning, and OSR's.

Figure 3C:
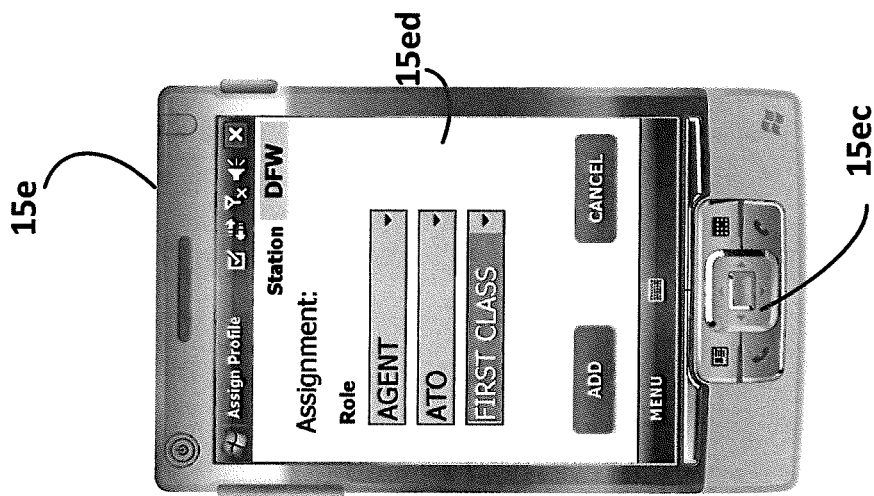
FIG. 3C is an illustration of the computer of FIG. 2A, according to yet another exemplary embodiment.
Figure 3B:
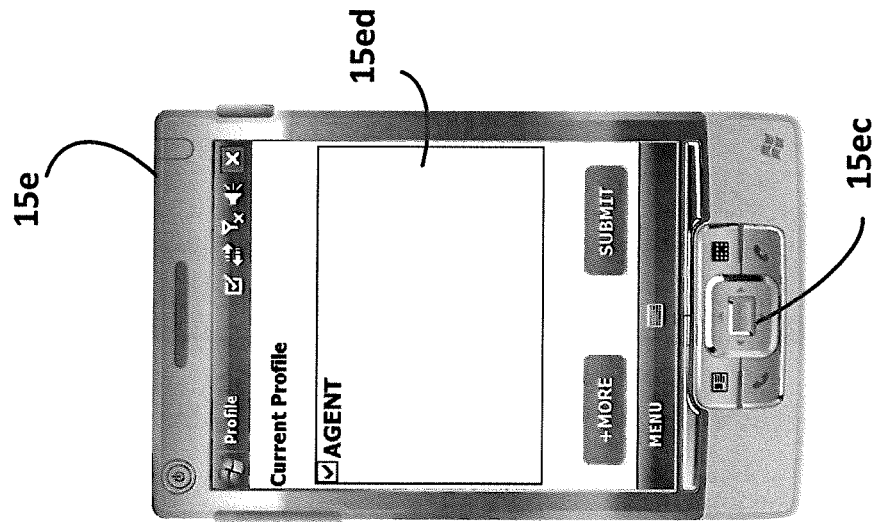
FIG. 3B is an illustration of the computer of FIG. 2A, according to another exemplary embodiment.
Figure 3A:
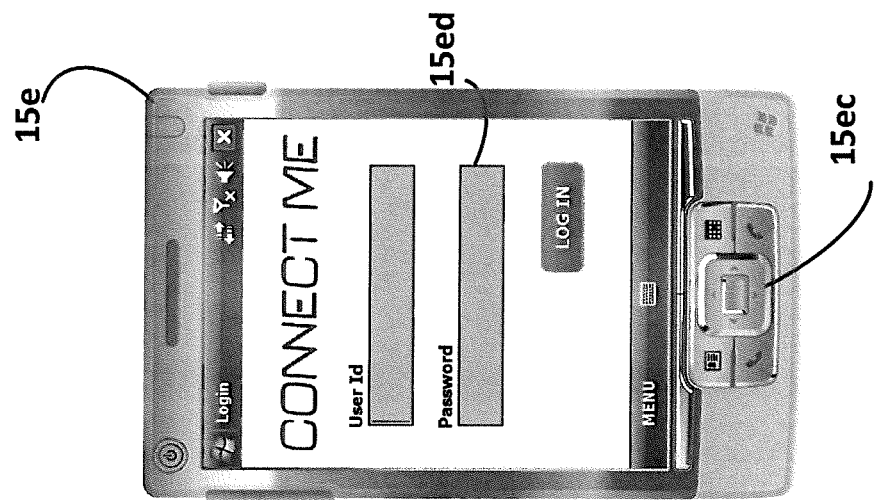
FIG. 3A is an illustration of the computer of FIG. 2A, according to an exemplary embodiment.
Figure 3E:
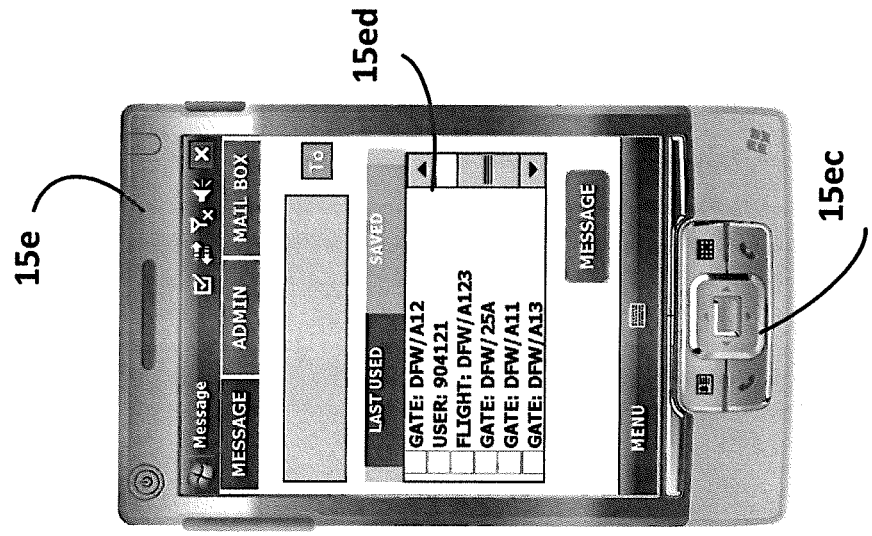
FIG. 3E is an illustration of the computer of FIG. 2A, according to yet another exemplary embodiment.
Figure 3D:
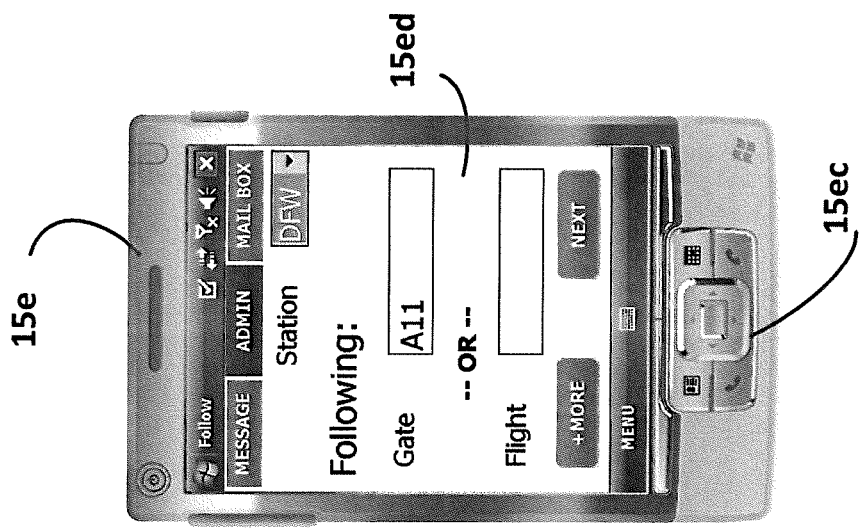
FIG. 3D is an illustration of the computer of FIG. 2A, according to yet another exemplary embodiment.
Figure 3G:
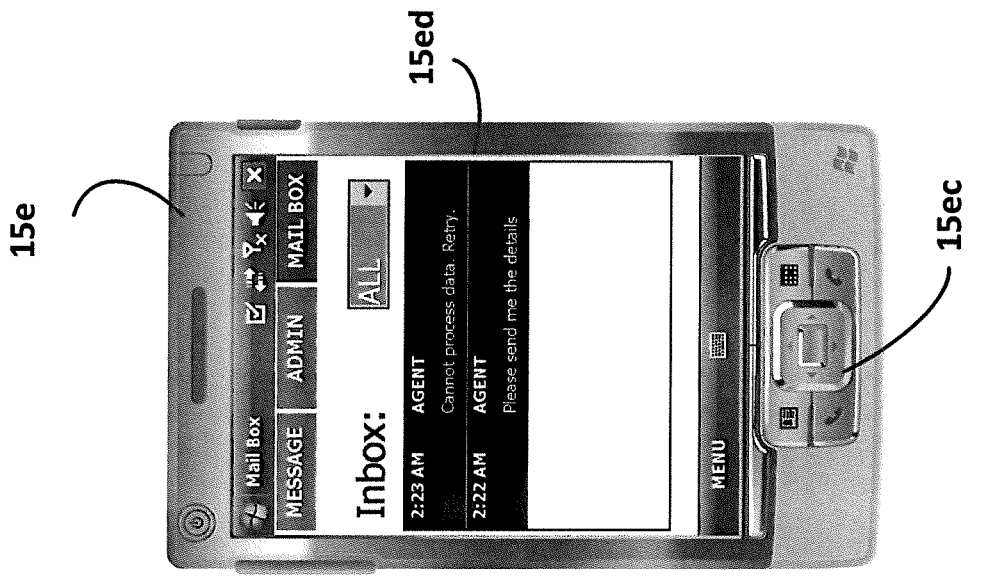
FIG. 3G is an illustration of the computer of FIG. 2A, according to yet another exemplary embodiment.
Figure 3F:
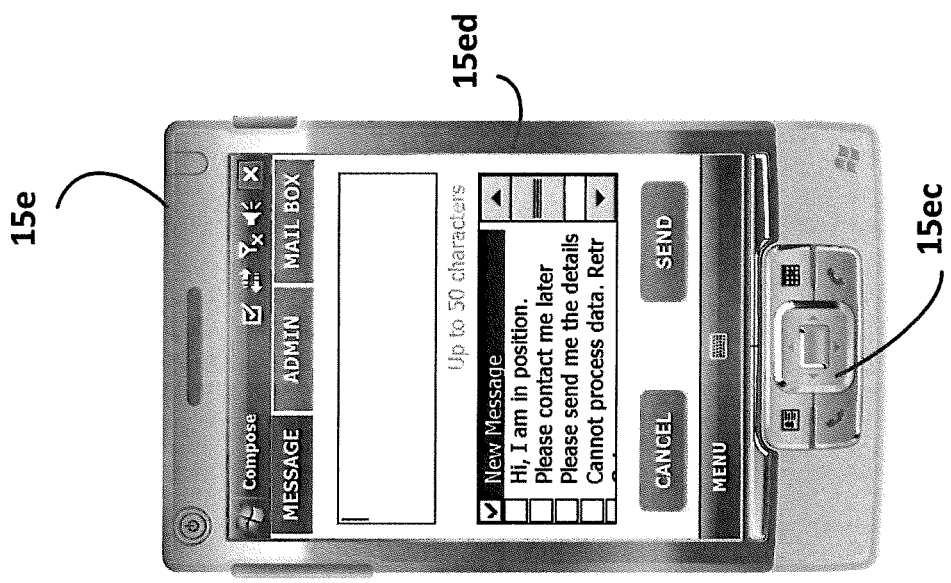
FIG. 3F is an illustration of the computer of FIG. 2A, according to yet another exemplary embodiment.
Figure 4:
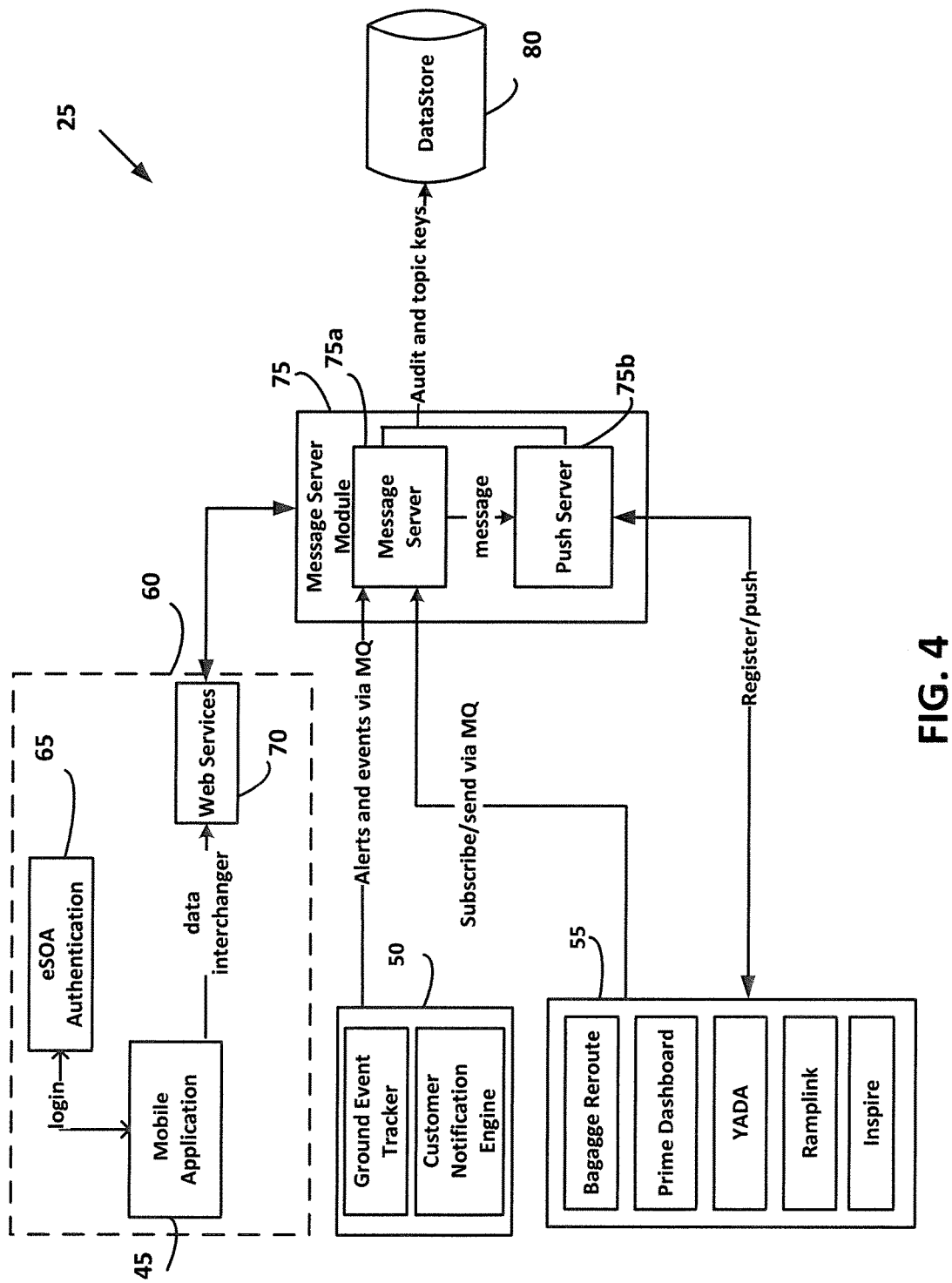
FIG. 4 is a conceptual architecture view of at least a portion of the system of FIG. 1, according to an exemplary embodiment.

FIGS. 3A-3H are illustrations of the computer 15e when the user 20e is using the mobile application 45, and FIG. 4 illustrates a conceptual architecture view of the system 10. Turning to FIGS. 3A-3H and 4, using the communication platform 25 along with context-based information for a recipient user, the agent 20e may, using the computer 15e, initiate communication with the computer 15c of the mechanic 20c or with a personal cell phone of the mechanic 20c, without knowing the identification or contact information of the user 20c. Thus, the platform 25 allows for anonymous communication between users. In an exemplary embodiment, the mobile application 45 is a "stand alone" application in that it is a mobile application that is downloaded onto the computer 15e for the purpose of connecting to the communication platform 25. In an exemplary embodiment, the mobile application 45 forms a portion of a "direct access" module 60 (shown in FIG. 4) within the communication platform 25. As shown in FIG. 3A, the mobile application 45 displays a prompt on the output device 15ed of the computer 15e so that the agent 20e is prompted to enter his or her user identification and password using the input device 15ec. An eSOA authentication 65 authenticates the user identification and password. As shown in FIGS. 3B and 3C, the mobile application 45 also displays a prompt on the output device 15ed of the computer 15e so that the agent 20e is prompted to enter his or her context-based information or profile information, such as the employee role, the employee location (i.e., station, gate, etc.), and the employee work assignment, using the input device 15ec. As shown in FIG. 3D, the mobile application 45 also displays a prompt on the output device 15ed of the computer 15e so that the agent 20e is prompted to follow or subscribe to an employee location or employee work assignment, such as a flight, using the input device 15ec. When the user follows or subscribes to a location or flight, the user is included in a group of users that will receive communications relating to the location or the flight. In an exemplary embodiment, the mobile application 45 uses web services 70 to communicate the entered information to a message server module 75, with some or all of the entered information being stored in a datastore 80. Thus, the datastore 80 stores and tracks context-based information of the user 20e and the followed or subscribed to context-based information. In an exemplary embodiment and as shown in FIG. 3E, when the agent 20e wants to initiate contact with another user, the agent 20e creates a new message using the input device 15ec and output device 15de with the recipient defined by location, such as "GATE: DFW/A12", work assignment, such as "FLIGHT: DFW/A123", or a user identification number. As shown in FIG. 3F, the mobile application 45 also displays a prompt on the output device 15ed of the computer 15e so that the agent 20e is prompted to enter a message, which may be selected from a variety of template messages, using the input device 15*ec*. As shown in FIG. 3G, the mobile application 45 also displays incoming messages, of which the user 15*e* is the unknown intended recipient. In an exemplary embodiment, messages may be filtered by a role level or by the user 15*e*. In an exemplary embodiment, the mobile application 45 is stored in the user's personal cell phone or other mobile phone. In an exemplary embodiment, the user 20*e* may access an administrative version of the application 45 to edit or update the context-based information for the user 20*e* or to create and manage message profiles (i.e., information relating to the communication, or message, that the user 20*e* is initiating). In an exemplary embodiment, the mobile application 45 uses a data interchanger to communicate with the web services 70 that communicates with the message server module 75 directly. In an exemplary embodiment, the mobile application 45 is an executable mobile application that when executed by the user is then associated with the user.

In an exemplary embodiment, the message server module 75 includes a message server 75*a* and a push server 75*b*, but may include any variety of number of servers. As shown in FIG. 4, the message server 75*a* communicates with the push server 75*b* by sending messages to the push server 75*b*. The message server 75*a* is also adapted to receive alerts and events from the external applications 50, receive messages from the client applications 55, store the subscriptions associated with the client applications 55, and send out audit and topic keys to the datastore 80. Moreover, and in some embodiments, the message server 75*a* is adapted to send messages via the push server 75*b* to the client applications 55. In an exemplary embodiment, the message server 75*a* is adapted to store the alerts, events, and messages communicated within the platform 25 to the datastore 80. The data within the alerts, events, and messages, including the audit and topic keys may be stored in datastore 80. The push server 75*b* is adapted to send out audit and topic keys to the datastore 80 and push out messages to the appropriate client applications 55. The client applications 55 that need the messages pushed to them are adapted to register with the push server 75*b* using application program interfaces (APIs). In an exemplary embodiment, the message server module 75 is or includes a transmission server.

In an exemplary embodiment, a system 10 also processes inbound communications, such as alerts or messages, to the message server module 75 from the external applications 50 and client applications 55. In an exemplary embodiment, the external applications 50 may be any one or more of a customer notification engine that sends flight information data to the message server module 75; a ground event tracker that is a central repository of events leading to departure, such as tracking bags loading and passenger boarding near real time, a generic queue that sends messaging requests from other systems; and a generic queue that sends event data from other systems. Additional external applications that send a variety of alerts, events, or messages to the message server module 75 may also be included. In an exemplary embodiment, the client applications 55 may include or be any one or more of a Baggage Reroute application or module that facilitates baggage routing at an airport; a customer assistance application that is used by agents at the airport to assist customers; a Ramplink+ application or module that helps sort luggage at an airport, among others, which send messages, alerts, events, or other data to the message server module 75. Regardless, the message server module 75 processes the inbound alerts, events, or messages from the external applications 50 and the client applications 55. In an exemplary embodiment, the external applications 50 are adapted to send alerts or events to the message server 75*a* via message queues. In an exemplary embodiment, the client applications 55 may send context-based information relating to the user of the client application 55 to the message server module 75. For example, when the baggage handler 20*d* provides his or her user id and password to the client application 55 within the computer 15*d*, the user 20*d* may also provide his or her context-based information and may follow or subscribe to an employee location or employee work assignment, such as a flight, using the computer 15*d*. However, in another exemplary embodiment, the client application 55 automatically detects or otherwise determines the context-based information of the user 20*d*. In an exemplary embodiment, each of the external applications 50 and the client applications 55 is an executable mobile application that when executed by the user is then associated with the user.

As shown in FIG. 4, the server module 75 is adapted to interface with and provide communication between many types of sources, such as the external applications 50, the client applications 55, and the mobile application 45. The communication platform 25 is adapted to accommodate communication between different types of applications regardless of the application communication protocol and data format. In an exemplary embodiment, the communication platform 25 provides unified messaging functionalities that allow connectivity between users on various mobile, desktop, and web applications. In an exemplary embodiment, the communication platform 25 provides messaging as an enterprise service that is easily integrated to any existing application. In an exemplary embodiment, the communication platform 25 provides a central location that tracks and audits the various messages that are sent across all of the applications. In an exemplary embodiment, the communication platform 25 provides the ability to specify message hierarchies that are specific to a business vertical. In an exemplary embodiment, the communication platform 25 uses web-based admin GUI to create and manage message profiles. In an exemplary embodiment, the communication platform 25 provides ready-to-use mobile screens that can be easily integrated to existing applications when using the existing framework. For example and in an exemplary embodiment, enabling the communication platform 25 may be simple as enabling a flag in the application configuration file. In an exemplary embodiment, the communication platform 25 provides framework code that abstracts the server communication and configuration for ease of integration. In an exemplary embodiment, the communication platform 25 uses the mobile application 45 for desktop and mobile clients when the user does not have access to any client applications 55. In fact and in an exemplary embodiment, when the user has access to any one of the client applications 55, a separate application to communication with the communication platform 25 is not required. In an exemplary embodiment, the communication platform 25 provides all the reporting in business intelligence and performance management software, such as Cognos. In an exemplary embodiment, the communication platform 25 reduces the duplication of communication efforts, and thus may result in any one of the message server module 75, the external applications 50, the client applications 45, the database 80, or any other component within the communication platform 25 having faster response times and requiring less memory. This in turn, improves the performance of any one of the message server module 75, the external applications 50, the client applications 45, and the database 80. In an exemplary embodiment, the communication platform 25 results in role-based communication between anonymous users using context-based information.

Figure 5:
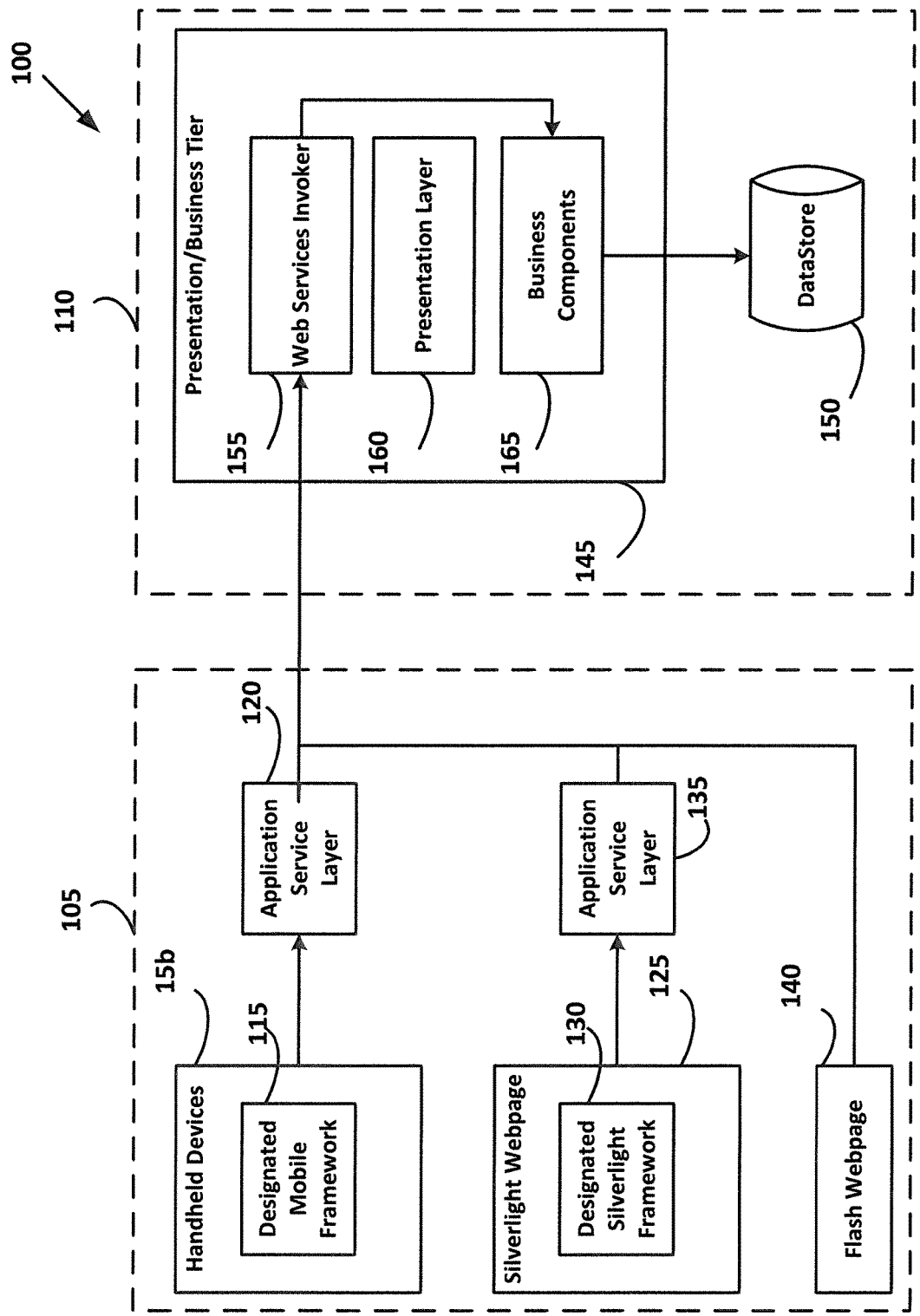
FIG. 5 is an illustration of the meta-architecture of an application layer of the system of FIG. 1, according to an exemplary embodiment.

FIG. 5 illustrates the meta-architecture of an application layer of the system 10 and is generally referred to by the reference numeral 100. In an exemplary embodiment, clients 105 interact with services 110 in a variety of ways. For example, the user 20b may use a handheld device, such as the computer 15b, that has a designated mobile framework 115 to communicate to an application service layer 120. Additionally, the user 20a may also use the computer 15a to access a Silverlight webpage 125 that has a designated Silverlight framework 130 to communicate to an application service layer 135 to further communicate with the services 110. In an exemplary embodiment, the clients 105 can also "directly" communicate with the services 110 with a flash webpage 140. The services 110 are made up of a presentation/business tier 145 and a datastore 150, which may be the datastore 70 or a separate datastore. In an exemplary embodiment, the presentation/business tier 145 includes of a web services invoker 155, business components 160, and a presentation layer 165. In an exemplary embodiment, the application service layer 120, the application services layer 130, and the Flash Webpage 140 directly communicate with the Service Invoker 155. The Web Service Invoker 155 provides a generic method to run the Business Components 165. The Business Components 65 contains the core functionality that communicates with the datastore 150. The presentation layer 160 hosts the user interface for the services 110. Generally, no changes are required to the code of the clients 105 to implement the platform 25. Instead, framework code is modified to support communication with the message server module 75 and the framework code is integrated with the code of the clients 105. Considering the clients 105 may include a variety of applications, messages sent from one application in a first format may not be readable by another application that requires a second, different format. Thus, additional interfaces having an OnConnect method, such as an IMessagingServerMannager, and an OnMessage method, may be added to the framework of the platform 25. In an exemplary embodiment, the OnConnect method implements the registration and subscription with the message server module 75. In an exemplary embodiment, the OnMessage method processes messages to the specific client application. Thus, the services 110 acts as a set of SOAP services so that the clients 105 may use a wide variety of technologies. That is, the platform 25 identifies, using the message server module 75, a first format associated with a first message and identifies a second format associated with the application that is associated with an unknown intended recipient and then reformats the first message from the first format to the second format to provide an unified framework for communications thereby reducing duplication of communication efforts and thus improving the functioning of server itself. In an exemplary embodiment, the message server module 75 may use an XML file to reformat the first message from the first format to the second format.

In an exemplary embodiment, the services 110 use a push technology to push the messages to the clients 105 instead of a direct polling. Additionally, the services 110 expose a set of application program interfaces to register for and get notified for the messages. In an exemplary embodiment, one or more XML files may be added to a resources folder for each of the client applications 55 that details the message structure and that generates a ConnectMeMessage.cs file.

Figure 6:
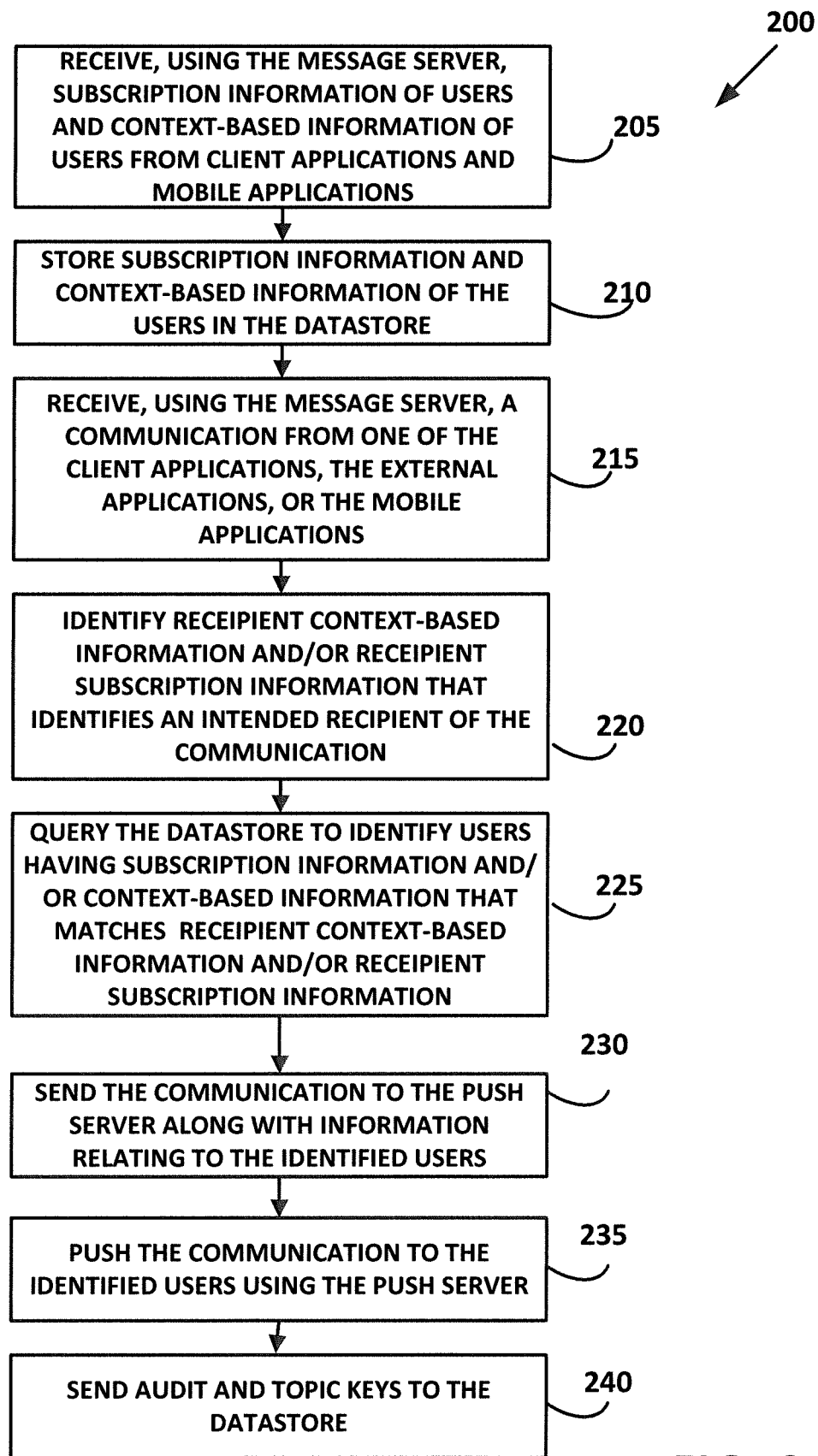
FIG. 6 is a flow chart illustration of a process of operating the system of FIG. 1, according to an exemplary embodiment.

In an exemplary embodiment, as illustrated in FIG. 6, a method of operating the system 10 is generally referred to by the reference numeral 200. In an exemplary embodiment, the method 200 includes receiving, using the message server module 75, subscription data, or information, of users and context-based information of users from the mobile applications 45 and/or the client applications 55 at step 205, storing the subscription information and/or the context-based in the datastore 80 at step 210; receiving, using the message server module 75, a communication from one of the client applications 55, the external applications 50, or the mobile applications 45 at step 215; identifying recipient context-based information and/or recipient subscription information that identifies an intended recipient of the communication at step 220; querying the datastore 80 to identify users having subscription information and/or context-based information that matches the recipient context-based information and/or the recipient subscription data at step 225; sending the communication to the push server 75b along with the information relating to the identified users at step 230; pushing the communication to the identified users using the push server 75b at step 235; and sending audit and topic keys to the datastore 80 at step 240.

At the step 205, the message server module 75 receives subscription information of users and context-based information of users from the client applications 55 and the mobile applications 45. Generally, context-based information of users and subscription information of users will be provided when a user logs in to an application, such as the client application 55 or the mobile application 45. When the client application 55 or the mobile application 45 is started, the message server 75a polling functionality is initiated.

At the step 210, the subscription information and the context-based information of the users are stored in the datastore 80. In addition, the datastore may store information relating to the identification of the user, the application name from which the user logged in, the device from which the user is active, the phone number and service provider associated with a device from which the user is active, the station from which the user is active, etc.

At the step 215, the message server module 75 receives the communication from one of the client applications 55, the external applications 50, or the mobile application 45. In one or more exemplary embodiments, the communication may include any one of an email, a text message, a request for contact information for a specific user, etc. For example, and referring back to FIG. 3E, the user 20e may request a phone contact of another user by accessing sub-profiles within each of the profiles of "GATE: DFW/A12", etc. In an exemplary embodiment, the communication and the details associated with the communication is stored in the datastore 80. The communication may also be received by the message server module 75 from the external clients 50 via a message queue.

At the step 220, the message server 75a identifies recipient context-based information and/or the recipient subscription information that is within the communication and that identifies an intended recipient of the communication.

At the step 225, the datastore 80 is queried, using the message server module 75, to identify users that have subscription information and/or context-based information that matches the recipient context-based information and/or the recipient subscription information.

At the step 230, the message server 75a sends the alert, the event, or the message to the push server 75b along with the information relating to the identified user.

At the step 235, the push server 75b pushes the alert, the event, or the message to the identified users. In an example embodiment and when the user requests phone contacts, the message server module 75 presents a phone contact for the identified user based on the provided context-based information. In an exemplary embodiment, when the phone contact (i.e., phone number) or list of phone contacts is presented to the sender of the message, the user selects one of the phone numbers and then selects a "call" button to initiate a phone call to the selected phone number. Thus, although the platform 25 may receive the message via the internet, the user may initiate communication with the recipient using any type of wireless communication channel. In an exemplary embodiment and when the communication is a text message, the communication will be emailed, using the message server module 75, to the service provider of the recipient along with the phone number of the recipient so that the service provider may send the recipient the text message via sms. Thus, while the user 20d logs in to a computer 15d and provides context-based information to the platform 25 via the computer 15d, the user 20d may receive communications from the platform 25 via his or her personal cell phone or receive phone calls on his or her personal cell phone from other users within the platform 25.

At the step 240, the push server 75b sends audit and topic keys to the datastore 80. Additionally, a history of the communication (e.g., the sender of the communication, the recipient(s) of the communication, the read time of the message, the deleted time of the message, etc.) is stored in the datastore 80.

Additionally, and in an exemplary embodiment, the message server 75a may receive status information relating to the processed or sent message from the mobile application 45, the external application 50, or the client applications 55. For example, if the message is considered a "high status" or "urgent" message, the recipient user may acknowledge receipt of the message and/or provide a status relating to the subject of the message. This acknowledgment or status update may be sent from the recipient and to the message server 75a.

In an exemplary embodiment, the platform 25 processes airline teletype system messages using TTY addresses. Additionally and in one exemplary embodiment, one or more of the computers 15a-15e is adapted to communicated with a Global Positioning System (GPS) or triangulation system such that the location of the user associated with the computers 15a-15e is automatically detected and updated in the datastore 80. Alternately, when the computer having GPS capabilities is within a certain distance of an interested point, a message can be dispatched to the computer or another application or person. Moreover and in an exemplary embodiment, business events can trigger a message, alert, or other communication in the platform 25. In an exemplary embodiment, the platform 25 provides a voice conference options for picking the list of users.

Figure 7:
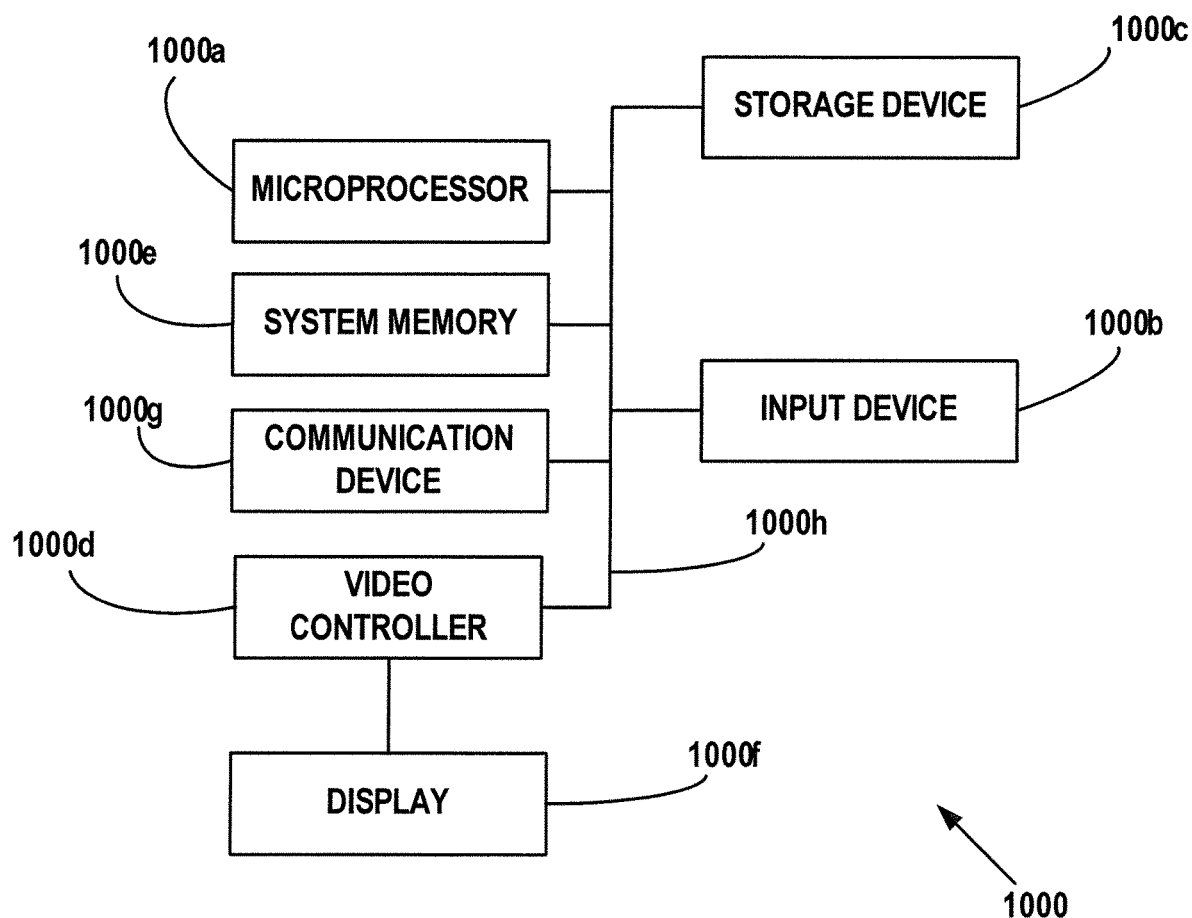
FIG. 7 is a diagrammatic illustration of a node for implementing one or more exemplary embodiments of the present disclosure, according to an exemplary embodiment.

In an exemplary embodiment, as illustrated in FIG. 7, an illustrative node 1000 for implementing one or more of the exemplary embodiments described above, illustrated in FIGS. 1-6, and/or any combination thereof, is depicted. The node 1000 includes a microprocessor 1000a, an input device 1000b, a storage device 1000c, a video controller 1000d, a system memory 1000e, a display 1000f, and a communication device 1000g interconnected by one or more buses 1000h. In several exemplary embodiments, the storage device 1000c may include a floppy drive, hard drive, CD-ROM, optical drive, any other form of storage device and/or any combination thereof. In several exemplary embodiments, the storage device 1000c may include, and/or be capable of receiving, a floppy disk, CD-ROM, DVD-ROM, or any other form of computer-readable medium that may contain executable instructions. In several exemplary embodiments, the communication device 1000g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, smartphones and cell phones.

In several exemplary embodiments, one or more of the components of the systems described above, illustrated in FIGS. 1-7, and/or any combination thereof, include at least the node 1000 and/or components thereof, and/or one or more nodes that are substantially similar to the node 1000 and/or components thereof. In several exemplary embodiments, one or more of the above-described components of the node 1000 and/or the platform 25 include respective pluralities of the same components.

In several exemplary embodiments, one or more of the applications, systems, and application programs described above, such as for example the mobile application 45, the external application 50, and/or the client application 55, illustrated in FIGS. 1-9, and/or any combination thereof, include a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several exemplary embodiments pulls real-time information from one or more servers, automatically refreshing with latest information at a predetermined time increment; or any combination thereof.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software as well as computer sub-systems.

In several exemplary embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, any networks and/or one or more portions thereof may be designed to work on any specific architecture. In an exemplary embodiment, one or more portions of any networks may be executed on a single computer, local area networks, client-server networks, wide area networks, internets, hand-held and other portable and wireless devices and networks.

In several exemplary embodiments, a database may be any standard or proprietary database software. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a plurality of instructions stored on a computer readable medium may be executed by one or more processors to cause the one or more processors to carry out or implement in whole or in part the above-described operation of each of the above-described exemplary embodiments of the system, the method, and/or any combination thereof. In several exemplary embodiments, such a processor may include one or more of the microprocessor 1000a, any processor(s) that are part of the components of the system, and/or any combination thereof, and such a non-transitory computer readable medium may be distributed among one or more components of the system. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

A method of providing a context-based communication platform has been described and includes storing an executable application on a computer readable medium within each remote computer in a plurality of remote computers, wherein when the executable application is executed the application is associated with an individual user; receiving, at a server and from the application within each remote computer in the plurality of remote computers, user contact data and user context data for each individual user, wherein the user context data includes data regarding one of a role of the individual user; the location of the individual user; and a work assignment of the individual user; storing, in a database that is in communication with the server, the user contact data and user context data for each individual user; receiving, at the server, a communication that includes user context data associated with an intended recipient, the identity of which is unknown, wherein the intended recipient is one of the individual users; and identifying, using the server and the database, the user contact data of the unknown intended recipient based on the user context data of the unknown intended recipient. In an exemplary embodiment, the communication is a message for the unknown intended recipient; and the method further includes sending, from the server, the message to the application within the remote computer in the plurality of remote computers that is associated with the unknown intended recipient. In an exemplary embodiment, the method also includes identifying, using the server, a first format associated with the message; identifying, using the server, a second format associated with the application that is associated with the unknown intended recipient; and reformatting, using the server, the message from the first format to the second format to provide an unified framework for communications thereby reducing duplication of communication efforts and thus improving the functioning of the server itself. In an exemplary embodiment, the communication is a request for user contact data of the unknown intended recipient; wherein the communication is received from a first application; and the method further includes sending, from the server, the contact data of the unknown intended recipient to the first application. In an exemplary embodiment, the communication is a message for the unknown intended recipient; and the method further includes emailing, from the server, the message and the user contact data to a service provider which sends, using the user contact data, the message to a mobile phone of the unknown intended recipient. In an exemplary embodiment, the method also includes generating an automatic alert based on an event trigger using a client application that is in communication with the sever, wherein the automatic alert is the communication. In an exemplary embodiment, the role of the individual user includes an employee role within an airline; the location of the individual user includes a description of a location within an airport; and the work assignment of the individual user includes an airline flight. In an exemplary embodiment, the method also includes receiving, at the server and from the application within each remote computer in the plurality of remote computers, subscription group data for each individual user; wherein the communication further includes subscription group data associated with the unknown intended recipient; wherein identifying, using the server and the database, the user contact data of the unknown intended recipient is further based on the subscription group data associated with the unknown intended recipient; wherein the communication is a message for the unknown intended recipient; and sending, from the server, the message to the application within the remote computer in the plurality of remote computers that is associated with the unknown intended recipient.

An apparatus for providing context-based communication has been described and includes: a non-transitory computer readable medium; and a plurality of instructions stored on the non-transitory computer readable medium and executable by one or more processors, the plurality of instructions including: instructions that cause the one or more processors to receive from an application within each remote computer in a plurality of remote computers, user contact data and user context data for each individual from a plurality of individuals, wherein the user context data includes data regarding at least one of: a role of the individual user; the location of the individual user; and a work assignment of the individual user; instructions that cause the one or more processors to store in a database that is in communication with the processors, the user contact data and user context data for each individual user; instructions that cause the one or more processors to receive a communication that includes user context data associated with an intended recipient, the identity of which is unknown, wherein the unknown intended recipient is one of the individual users; and instructions that cause the one or more processors to search the database to match the user context data associated with the unknown intended recipient with the stored user context data for each of the individual users. In an exemplary embodiment, the communication is a message for the unknown intended recipient; and wherein the plurality of instructions further includes instructions that cause the one or more processors to send the message to the application within the remote computer in the plurality of remote computers that is associated with the unknown intended recipient. In an exemplary embodiment, the plurality of instructions further includes: instructions that cause the one or more processors to identify a first format associated with the message; instructions that cause the one or more processors to identify a second format associated with the application that is associated with the unknown intended recipient; and instructions that cause the one or more processors to reformat the message from the first format to the second format to provide an unified framework for communications thereby reducing duplication of communication efforts and thus improving the functioning of server itself. In an exemplary embodiment, the communication is a request for user contact data of the unknown intended recipient; the communication is received from a first application; and the plurality of instructions further includes instructions that cause the one or more processors to send the contact data of the unknown intended recipient to the first application. In an exemplary embodiment, the communication is a message for the unknown intended recipient; and the plurality of instructions further includes instructions that cause the one or more processors to email the message and the user contact data to a service provider which sends, using the user contact data, the message to a mobile phone of the unknown intended recipient. In an exemplary embodiment, the plurality of instructions further includes instructions that cause the one or more processors to generate an automatic alert based on an event trigger using a client application that is in communication with the sever, wherein the automatic alert is the communication. In an exemplary embodiment, the role of the individual user includes an employee role within an airline; the location of the individual user includes a description of a location within an airport; and the work assignment of the individual user includes an airline flight. In an exemplary embodiment, the plurality of instructions further includes: instructions that cause the one or more processors to receive from the application within each remote computer in the plurality of remote computers, subscription group data for each individual user; wherein the communication further includes subscription group data associated with the unknown intended recipient; wherein identification of the user contact data of the unknown intended recipient is further based on the subscription group data associated with the unknown intended recipient; and wherein the communication is a message for the unknown intended recipient; and instructions that cause the one or more processors to send the message to the application within the remote computer in the plurality of remote computers that is associated with the unknown intended recipient.

A method of distributing airline-related alerts over a network has been described and includes storing an executable communication application on a computer readable medium within each remote computer in a plurality of remote computers, wherein when the communication application is executed the application is associated with an individual user; receiving, at a transmission server and from the application within each remote computer in the plurality of remote computers, user contact data and user context data for each individual user, wherein the user context data includes data regarding at least one of: a role of the individual user; the location of the individual user; and a work assignment of the individual user; storing, in a database that is in communication with the transmission server, the user contact data and user context data for each individual user; and receiving an airline-related alert at the transmission server sent from a data source over the internet, the transmission server including a microprocessor and the database; wherein the airline-related alert includes user context data associated with an intended recipient, the identity of which is unknown, wherein the unknown intended recipient is one of the individual users; and wherein the microprocessor: identifies the user contact data of the unknown intended recipient based on the user context data of the unknown intended recipient; and initiates, with the unknown intended recipient, transmission of the travel-related alert over a wireless communication channel to a mobile phone that is not the remote computer of each remote subscriber, the mobile phone associated with the user contact data of the unknown intended recipient; and wherein the initiation of the transmission of the travel-related alert over the wireless communication channel to the mobile phone that is not the remote computer of the unknown intended recipient enables communication between dynamically located and unknown individuals. In an exemplary embodiment, the method also includes generating an automatic alert based on an event trigger using a client application that is in communication with the sever, wherein the automatic alert is the communication. In an exemplary embodiment, the role of the individual user includes an employee role within an airline; the location of the individual user includes a description of a location within an airport; and the work assignment of the individual user includes an airline flight. In an exemplary embodiment, the initiation of the transmission of the travel-related alert over the wireless communication channel to the mobile phone that is not the remote computer of unknown intended recipient provides a unified framework for communications thereby reducing duplication of communication efforts and thus improving the functioning of server itself.

It is understood that variations may be made in the foregoing without departing from the scope of the present disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to a shipping travel leg in which a ship travels from one port to one or more other ports. In an exemplary embodiment, aspects of the present disclosure are readily applicable and/or readily adaptable to a trucking travel leg during which a truck travels from one city to one or more other cities. In an exemplary embodiment, aspects of the present disclosure are readily applicable and/or readily adaptable to a rail travel leg during which a train travels from one city or station to one or more other cities or stations. In an exemplary embodiment, aspects of the present disclosure are applicable and/or readily adaptable to a wide variety of transportation transactions such as, for example, an airline sequence or itinerary (i.e., a plurality of airline flights), a travel leg of an airline sequence or itinerary (i.e., a single airline flight), an airline block, and/or any combination thereof.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 75a, paragraph 6 for any limitations of any of the claims herein, except for those in which the claim expressly uses the word "means" together with an associated function.

What is claimed is:

1. A method of providing a context-based communication platform, the method comprising:
    storing an executable application on a computer readable medium within each remote computer in a plurality of remote computers, wherein when the application is executed, the application is associated with an individual user;
    receiving, at a server in communication with each remote computer, subscription group data for each individual user;
        wherein the subscription group data comprises a flight number;
    receiving, at the server, user contact data and user context data for each individual user;
        wherein receiving the user context data for each individual user comprises:
            receiving a first work assignment or role of a first individual user whose subscription data comprises the flight number;
            receiving a second work assignment or role of a second individual user whose subscription data comprises the flight number; and
            receiving a third work assignment or role of a third individual user whose subscription group data comprises the flight number;
        wherein the user context data for the first individual user comprises the first work assignment or role;
        wherein the user context data for the second individual user comprises the second work assignment or role;
        wherein the user context data for the third individual user comprises the third work assignment or role; and
        wherein the second work assignment or role and the third work assignment or role are different from the first work assignment or role;
    storing, in a database that is in communication with the server, the user contact data, the subscription group data, and the user context data for each individual user;
    displaying, using the application, a graphical user interface on a first remote computer associated with the first individual user,
        wherein the first remote computer is in the plurality of remote computers;
        wherein the graphical user interface is associated with a first communication and a second communication that are initiated by the first individual user;
        wherein the graphical user interface allows the first individual user to indicate the user context data and/or the subscription group data for a first intended recipient(s) of the first communication and a second intended recipient(s) of the second communication that are initiated by the first individual user;
        wherein the first and second intended recipient(s) of the first and second communication are one or more of the individual users whose identities are unknown by the first individual user;
        wherein the first intended recipient(s) includes the second individual user who has the second work assignment or role that is different from the first work assignment or role, and whose subscription data comprises the flight number; and wherein the second intended recipient(s) includes the third individual user who has the third work assignment or role that is different from the first work assignment or role, and whose subscription data comprises the flight number;

receiving, by the application and from the first individual user, via the graphical user interface of the first remote computer, the user context data and/or the subscription group data associated with the first intended recipient(s);

receiving, by the application and from the first individual user, via the graphical user interface on the first remote computer, a first message to be included in the first communication;

wherein receiving the first message to be included in the first communication comprises:

receiving, from the first individual user and by the application, a first message selected from a plurality of template messages displayed on the graphical user interface; or receiving, from the first individual user and by the application, a first message comprising words entered in a text box displayed on the graphical user interface;

receiving, at the server, the first communication that includes the user context data and/or the subscription group data associated with the first intended recipient(s);

identifying, using the server and the database, the user contact data of the first intended recipient(s) based on the user context data and/or the subscription group data associated with the first intended recipient(s);

sending, from the server and using the user contact data, the first communication to the first intended recipient(s), comprising sending the first communication to the application within a second remote computer that is associated with the second individual user, wherein the second remote computer is in the plurality of remote computers;

receiving, by the application and from the first individual user, via the graphical user interface of the first remote computer, the user context data and/or the subscription group data associated with the second intended recipient(s);

receiving, by the application and from the first individual user, via the graphical user interface on the first remote computer, a second message to be included in the second communication;

wherein receiving the second message to be included in the second communication comprises:

receiving, from the first individual user and by the application, a second message selected from the plurality of template messages displayed on the graphical user interface; or receiving, from the first individual user and by the application, a second message comprising words entered in the text box displayed on the graphical user interface;

receiving, at the server, the second communication that includes the user context data and/or the subscription group data associated with the second intended recipient(s);

identifying, using the server and the database, the user contact data of the second intended recipient(s) based on the user context data and/or the subscription group data associated with the second intended recipient(s);

sending, from the server and using the user contact data, the second communication to the second intended recipient(s), comprising sending the second communication to the application within a third remote computer that is associated with the third individual user, wherein the third remote computer is in the plurality of remote computers;

displaying simultaneously, on the graphical user interface of the first remote computer associated with the first individual user, at least portions of:

the first communication, the first communication comprising the first message and the user context data of the first intended recipient(s); and the second communication, the second communication comprising the second message and the user context data of the second intended recipient(s);

wherein the simultaneous display of the first and second communications provides a directory of relevant communications associated with the flight number; and wherein the respective portions of the first and second communications are chronologically and selectably displayed in the directory; and receiving a selection, via the graphical user interface of the first remote computer, of one of the simultaneously displayed communications in the directory.

2. The method of claim 1, further comprising:

identifying, using the server, a first format associated with the message;

identifying, using the server, a second format associated with the application that is associated with the intended recipient(s); and reformatting, using the server, the message from the first format to the second format to provide a unified framework for communications thereby reducing duplication of communication efforts and thus improving the functioning of the server itself.

3. The method of claim 1, wherein the second remote computer is a mobile phone; and wherein the method further comprises emailing, from the server, the message and the user contact data to a service provider which sends, using the user contact data, the message to the mobile phone of the intended recipient(s).

4. An apparatus for providing context-based communication, the apparatus comprising:

a non-transitory computer readable medium;

one or more processors; and a plurality of instructions stored on the non-transitory computer readable medium and executable by the one or more processors, the plurality of instructions comprising:

instructions that cause the one or more processors to receive, at a server in communication with each remote computer in a plurality of remote computers, subscription group data for each individual user;

wherein each individual user is from a plurality of individual users;

wherein each individual user is associated with a remote computer from the plurality of remote computers; and wherein the subscription group data comprises a flight number;

instructions that cause the one or more processors to receive, at the server, user contact data and user context data for each individual user;

wherein the instructions that cause the one or more processors to receive the user context data for each individual user comprises:
  instructions that cause the one or more processors to receive a first work assignment or role of a first individual user whose subscription data comprises the flight number;
  instructions that cause the one or more processors to receive a second work assignment or role of a second individual user whose subscription data comprises the flight number; and
  instructions that cause the one or more processors to receive a third work assignment or role of a third individual user whose subscription group data comprises the flight number;
  wherein the user context data for the first individual user comprises the first work assignment or role;
  wherein the user context data for the second individual user comprises the second work assignment or role;
  wherein the user context data for the third individual user comprises the third work assignment or role; and
  wherein the second work assignment or role and the third work assignment or role are different from the first work assignment or role;
instructions that cause the one or more processors to store in a database that is in communication with the processors, the user contact data, the subscription group data, and the user context data for each individual user;
instructions that cause a graphical user interface to be displayed on a first remote computer associated with the first individual user,
  wherein the first remote computer is in the plurality of remote computers;
  wherein the graphical user interface is associated with a first communication and a second communication that are initiated by the first individual user;
  wherein the graphical user interface allows the first individual user to indicate the user context data and/or the subscription group data for a first intended recipient(s) of the first communication and a second intended recipient(s) of the second communication that are initiated by the first individual user;
  wherein the first and second intended recipient(s) of the first and second communication are one or more of the plurality of individual users whose identities are unknown by the first individual user;
  wherein the first intended recipient(s) includes the second individual user who has the second work assignment or role that is different from the first work assignment or role, and whose subscription data comprises the flight number; and
  wherein the second intended recipient(s) includes the third individual user who has the third work assignment or role that is different form the first work assignment or role, and whose subscription group data comprises the flight number;
  wherein the graphical user interface allows a first message, from the first individual user, to be included in the first communication;
  wherein the graphical user interface allows a second message, from the first individual user, to be included in the second communication; and
  wherein when each of the first and second communications is initiated, the graphical user interface comprises:
    a first prompt to select a message from a plurality of template messages displayed on the graphical user interface; or
    a second prompt to enter words in a text box displayed on the graphical user interface;
  instructions that cause the one or more processors to receive the first and second communications that include the first and second messages and the subscription group data and/or the user context data associated with the first and second intended recipient(s);
  instructions that cause the one or more processors to search the database for user context data and/or subscription group data associated with each of the individual users that matches the user context data and/or the subscription group data associated with the first and second intended recipient(s); and
  instructions that cause the one or more processors to send, using the user contact data, the first and second communications to the application within the second and third remote computers that are associated with the second and third individual users instructions that cause the graphical user interface of the first remote computer associated with the first individual user to simultaneously display at least portions of:
    the first communication, the first communication comprising the first message and the user context data of the first intended recipient(s); and
    the second communication, the second communication comprising the second message and the user context data of the second intended recipient(s);
    wherein the simultaneous display of the first and second communications provides a directory of relevant communications associated with the flight number; and
    wherein the respective portions of the first and second communications are chronologically and selectably displayed in the directory; and
  instructions that cause the graphical user interface of the first remote computer to receive a selection of one of the simultaneously displayed communications in the directory.

5. The apparatus of claim 4, wherein the plurality of instructions further comprises:
  instructions that cause the one or more processors to identify a first format associated with the message;
  instructions that cause the one or more processors to identify a second format associated with the application that is associated with the intended recipient(s); and
  instructions that cause the one or more processors to reformat the message from the first format to the second format to provide a unified framework for communications thereby reducing duplication of communication efforts and thus improving the functioning of server itself.

6. The apparatus of claim 4,
wherein the second remote computer is a mobile phone; and
wherein the plurality of instructions further comprises instructions that cause the one or more processors to email the message and the user contact data to a service provider which sends, using the user contact data, the message to the mobile phone of the intended recipient(s).

* * * * *